United States Patent [19]

Chang et al.

[11] Patent Number: 5,428,729
[45] Date of Patent: Jun. 27, 1995

[54] SYSTEM AND METHOD FOR COMPUTER AIDED SOFTWARE ENGINEERING

[75] Inventors: Roger A. Chang, Irving; Andrew J. Smith, Trophy Club; Robert J. Torres, Colleyville, all of Tex.

[73] Assignee: International Business Machines Corporation, Armonk, N.Y.

[21] Appl. No.: 811,775

[22] Filed: Dec. 20, 1991

[51] Int. Cl.$^6$ ............................................. G06F 19/00
[52] U.S. Cl. .................................. 395/153; 395/155; 395/159; 395/161
[58] Field of Search ............... 395/153, 155, 159, 161, 395/700; 345/901, 1-2; 364/228.1, 221

[56] References Cited

U.S. PATENT DOCUMENTS

| | | | |
|---|---|---|---|
| 4,558,413 | 12/1985 | Schmidt et al. | 364/300 |
| 4,899,299 | 2/1990 | MacPhail | 364/570 |
| 4,974,173 | 11/1990 | Stefik et al. | 364/521 |
| 5,008,853 | 4/1991 | Bly et al. | 364/900 |
| 5,065,347 | 11/1991 | Pajak et al. | 395/159 |
| 5,159,669 | 10/1992 | Trigg et al. | 395/159 |
| 5,202,828 | 4/1993 | Vertelney et al. | 364/419 |
| 5,237,651 | 8/1993 | Randall | 395/148 |

FOREIGN PATENT DOCUMENTS

0319232A2  7/1989  European Pat. Off. ..... G06F 15/40

OTHER PUBLICATIONS

"Systems Application Architecture Common User Access Advanced Interface Design Reference Draft"; Aug. 24, 1991; pp. 172-173.

Lobba; "Automated Configuration Management"; Softool Corporation; 1985; pp. 100-103.

W. Scacchi, "Engineering Large-Scale Software Systems: An Organizational Knowledge Base Approach," Feb. 27, 1989, pp. 232-235.

Anonymous Research Disclosure, Database WPI, Jan. 10, 1989.

IBM Technical Disclosure Bulletin, vol. 33, No. 6B, Nov. 1990, Armonk, N.Y., pp. 114-117.

IBM Technical Disclosure Bulletin, vol. 32, No. 9A, Feb. 1990, Armonk, N.Y., Entire document.

*Primary Examiner*—Heather R. Herndon
*Assistant Examiner*—J. Feild
*Attorney, Agent, or Firm*—Jonathan E. Jobe; Andrew J. Dillon

[57] ABSTRACT

A data processing system supports preparation of a software application by coordinating the efforts of a metaprogrammer and a plurality of system users responsible to the metaprogrammer. The data processing system includes a plurality of workstations, each having a display and a user input device. Each of the workstations is connected to shared memory for access to data objects stored therein. One data object is a blank project container which includes a plurality of subject objects relating to phases in a product life for a software application. The metaprogrammer is authorized to replicate a blank project container to provide a project specified container available in shared memory to system users selected to work on a particular software application. The project specific container includes a plurality of subject objects relating to phases in a product life for the software application package. Data objects are stored in memory categorized within subject objects of the project container. An index is generated as data objects are created. Such an index is located with each subobject with each subject object. Lastly, private instances of the project container are generated relating to users. Each private instance includes a subset of the objects within the project container, selected on the basis of usefulness to the tasks assigned to this particular user.

6 Claims, 16 Drawing Sheets

SCREEN WITH COOKBOOK TEMPLATE AND PROGRAM INSTANCE

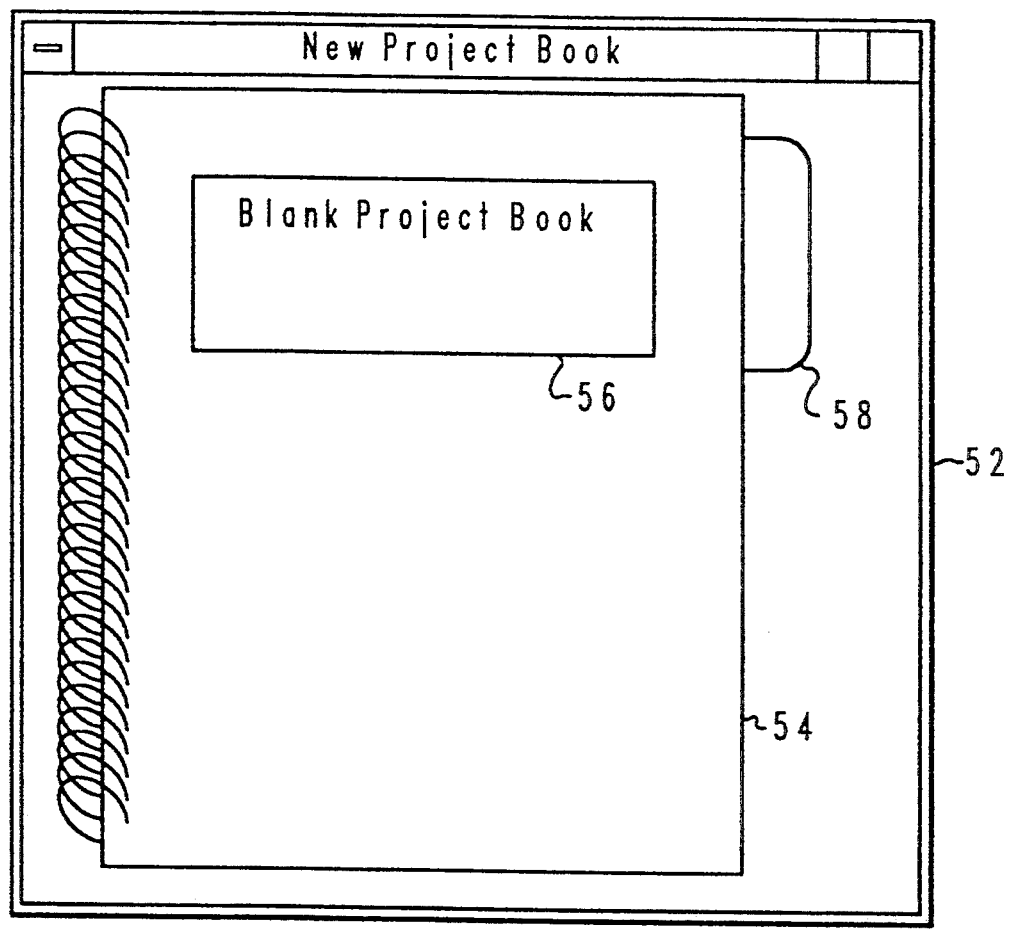
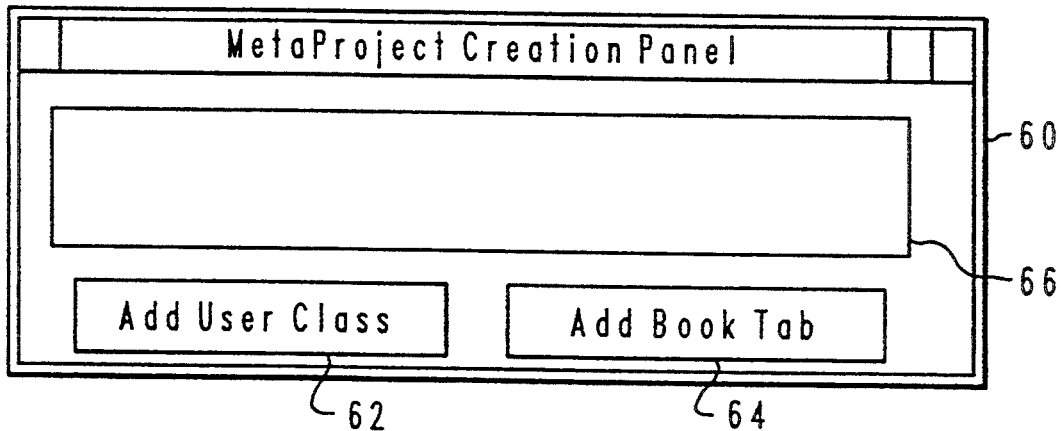
Fig. 4

Meta-Project

| | User Class 1 | User Class 2 | User Class 3 | User Class 4 |
|---|---|---|---|---|
| Book Tab 1 | R | W | R | W |
| Book Tab 2 | W | R | ... | R |
| Book Tab 3 | W | W | ... | ... |
| Book Tab n | R | R | R | W |

68

R = READ ONLY  W = BOTH READ AND WRITE AUTH.  ... = NO RIGHTS

User Class examples:
- Design
- Development
- Documentation
- Test
- Ship
- Support Book Tab examples:
- Specifications
- Code
- Test
- Document
- Build For each Tab and Class intersection you can define:
- Contents
- Rules
- Tools
- Authorizations

RUNNING/TESTING A PROGRAM

SYSTEM AND METHOD FOR COMPUTER AIDED SOFTWARE ENGINEERING

BACKGROUND OF THE INVENTION

1. Field of the Invention

The invention relates to a networked workstation system for software development. More particularly, the invention relates to coordinating the work of multiple users of the networked workstation system during creation of a software product. Still more particularly, the invention relates to a networked workstation system providing automated management of the design through the implementation of the software application.

2. Description of the Prior Art

Software includes computer programs, routines, programming languages and systems, and supporting documentation for any of the above. It extends to detailed procedures to be followed by a computer or its operator and thus includes documents such as handbooks, drawings, program listings and diagrams supporting use of an application on a computer. In its broadest sense, software will comprise all materials and procedures other than hardware relating to execution of a function or family of functions on a computer system. During the lifetime of a software product, additional documents or records that would be of interest to the product may be created. For example, for diagnostic purposes a complete record of all revisions may be valuable. Customer comments and requests regarding a document may also be logged.

In a formal development setting, the seed of a programming application is the request document. The request document describes, typically in general terms, the desired ends of the program application. From the request document, an objective document is prepared specifying attributes of the programming application including: (1) functional features; and (2) the user interface. Upon completion of an initial objective document, generation of specific design documents begins. The documents include functional specifications characterized by performance results required for operation on specified bodies of data. Another design document is the programming specifications which outline how the functional specifications are to be met. The request document, the objectives document, the functional specification and the programming specification together constitute a textual record of the development of a system. Completed design documents support programmer generation of source code for the application. Blocks of source code are an explicit ordering of the instructions to be carried out on a computer system.

Any major programming application development project involves dozens to hundreds of designers and programmers, frequently scattered among several locations. Management of such a project, particularly management aimed at generating and preserving a coherent body of supporting documentation relating to the project, has become a cumbersome undertaking. The management task of assuring that appropriate and timely supporting materials reach the designated people at the correct moment has been difficult. Also difficult has been the sufficient appraisal of designers, developers, programmers and testers of the tasks facing nonmembers of their respective groups.

The term programming environment has been used to refer to the operating system environment and the collection of tools and subroutines with which software is developed. See for example, Leblang et al. "Computer-Aided Software Engineering in a Distributed Workstation Environment", reprinting in proceedings of the ACM Sigsoft/Sigplan Software Engineering Symposium on Practical Software Developments Environments, Pittsburgh, Penna., 23-25 Apr. 1984. Leblang et al. describe an environment based on several managers, including a history manager which controls source code and provides complete version histories, a configuration manager which builds systems from their components and detects the need to rebuild, a task manager which relates source code changes made to nodes throughout a network to a particular higher level activities, a monitor manager which watches user-defined dependencies and alerts users upon triggering of certain dependencies, and an advice manager which holds general project related information and provides templates for redoing common tasks.

Concepts relating to control of relationships between individuals in a networked workstation system are also of relevance to the present invention. Bly et al., U.S. Pat. No. 5,008,853, discloses a multiuser collaborative system operating on a real-time basis. The particular focus of Bly et al. is the multiuser interface. Another aspect of Bly et al. are methods relating to access of "structured data objects". The term structured data object is used generically to denote a data object that contains a series of other data objects linked together in a predetermined manner and which may include a visual representation or a functional abstraction for a display screen. Member data objects of the structured data object may have associated sets of operations brought together for one or more functional purposes. An example of a structured data object is a word processing document with several pages, where each page is a data object and pages are preceding and subsequent pages in a predetermined order. A structured data object that is capable of holding other structured data objects is referred to as a container. Bly discloses employment of containers in a shared multiuser environment, where it is accessible to more than one user through a plurality of network coupled personal workstations.

Representation of a structured data object in iconic form is discussed at column 2, lines 50-55 of Bly et al. Among the iconic representations are a container type known as a book, which is a special directory that creates a relationship among document portions within the book. Consecutive documents in a book can share a single page number series and there is a facility to automatically create a table of contents and index.

Structured data objects, such as file folders and documents digitally stored in a file drawer, can be shared by many users in accordance with individually assigned access rights. This is accomplished by placing a digital copy of a structured data object on the user's desktop metaphor for the user's subsequent manipulation. Communications of revisions among users, if desired, must be specifically provided for.

Bly et al. specifically relates to construction of a publication management system. (See column 11, lines 32-61). The system is implemented through the abstraction of a shared book metaphor. The desktop metaphor of each workstation includes an abstraction representing the shared data structure, which abstraction is referred to as the shared book. A new book is begun by replication of a blank shared book and naming the replicated structure. Upon opening of a shared book by a user, a listing of entries, analogous to a table of contents, is displayed. However, a shared book does not admit other container type files (see column 18, lines 50–60). Beyond the pages of text for the shared book, the shared book also includes a property sheet providing fields for items that concern the shared book as a whole. These include the shared book's name, its file service, its database, its access list, the number of remote consecutive versions among other operational details.

SUMMARY OF THE INVENTION

It is one object of the invention to provide a network of workstations supporting a software development project.

It is another object of the invention to coordinate the work of a metaprogrammer and other users of a system of networked workstations in developing a software application project.

It is still another object of the invention to automate management of the design through the implementation of a software application.

The foregoing objects are achieved as is now described. A data processing system supports preparation of a software application by coordinating the efforts of a metaprogrammer and a plurality of system users responsible to the metaprogrammer. The data processing system includes a plurality of workstations, each having a display and a user input device. Each of the workstations is connected to shared memory for access to data objects stored therein. One data object is a blank project container which includes a plurality of subject objects relating to phases in a product life for a software application. The metaprogrammer is authorized to replicate a blank project container to provide a project specified container available in shared memory to system users selected to work on a particular software application. The project specific container includes a plurality of subject objects relating to phases in a product life for the software application package. In addition, the project specified container includes a directory to templates for use in creating standard software modules and functions selected for use in generating code for storage in data objects. Data objects are stored in memory categorized within subject objects of the project container. An index is generated as data objects are created. Such an index is located with each subobject with each subject object. Lastly, private instances of the project container are generated relating to users. Each private instance includes a subset of the objects within the project container, selected on the basis of usefulness to the tasks assigned to this particular user.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a pictorial representation of a control through which a blank software cookbook is accessed by a user utilizing the system and method of the present invention;

FIG. 5 is a block diagram of a user class table utilized in constructing private instances of a program instance notebook;

DETAILED DESCRIPTION OF THE INVENTION

Figure 1:
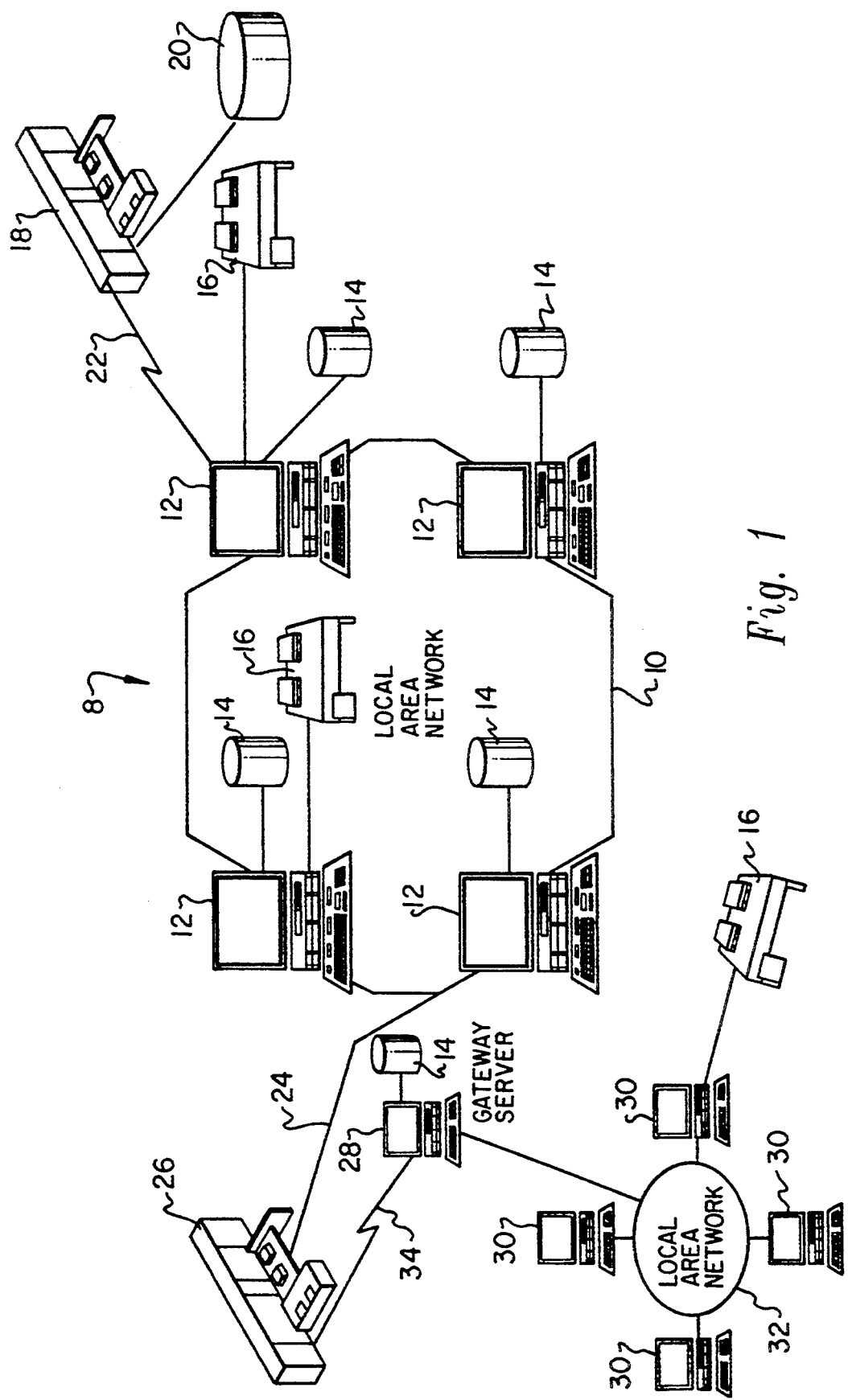
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as local area networks 10 and 32, each of which preferably includes a plurality of individual computers 12 and 30, respectively. Of course, those skilled in the art will appreciate that a plurality of intelligent workstations coupled to a host processor may be utilized to implement each such network.

As is common in such data processing systems, each individual computer may be coupled to a storage device 14 and/or a printer/output device 16. One or more such storage devices 14 may be utilized, in accordance with the method and system of the present invention, to store the various objects or documents which may be periodically accessed by a user having access to such objects or documents in the data processing system implemented computer aided software development environment.

Still referring to FIG. 1, it may be seen that distributed data processing system S may also include mainframe computer, such as a mainframe computer 18, which may be preferably coupled to local area network 10 by means of communication link 22. Mainframe computer 18 may be coupled to a storage device 20 which may serve as a remote storage for local area network 10 and may be coupled via communications controller 26 and communications link 34 to gateway server 28. Gateway server 28 is preferably an individual computer or intelligent workstation which serves to link a local area network 32 to local area network 10. As discussed above with reference to local area network 32 and local area network 10, a plurality of data objects or documents may be stored within storage device 20 and controlled by mainframe computer 18, as resource manager or library service for the data objects and documents there stored.

Figure 2:
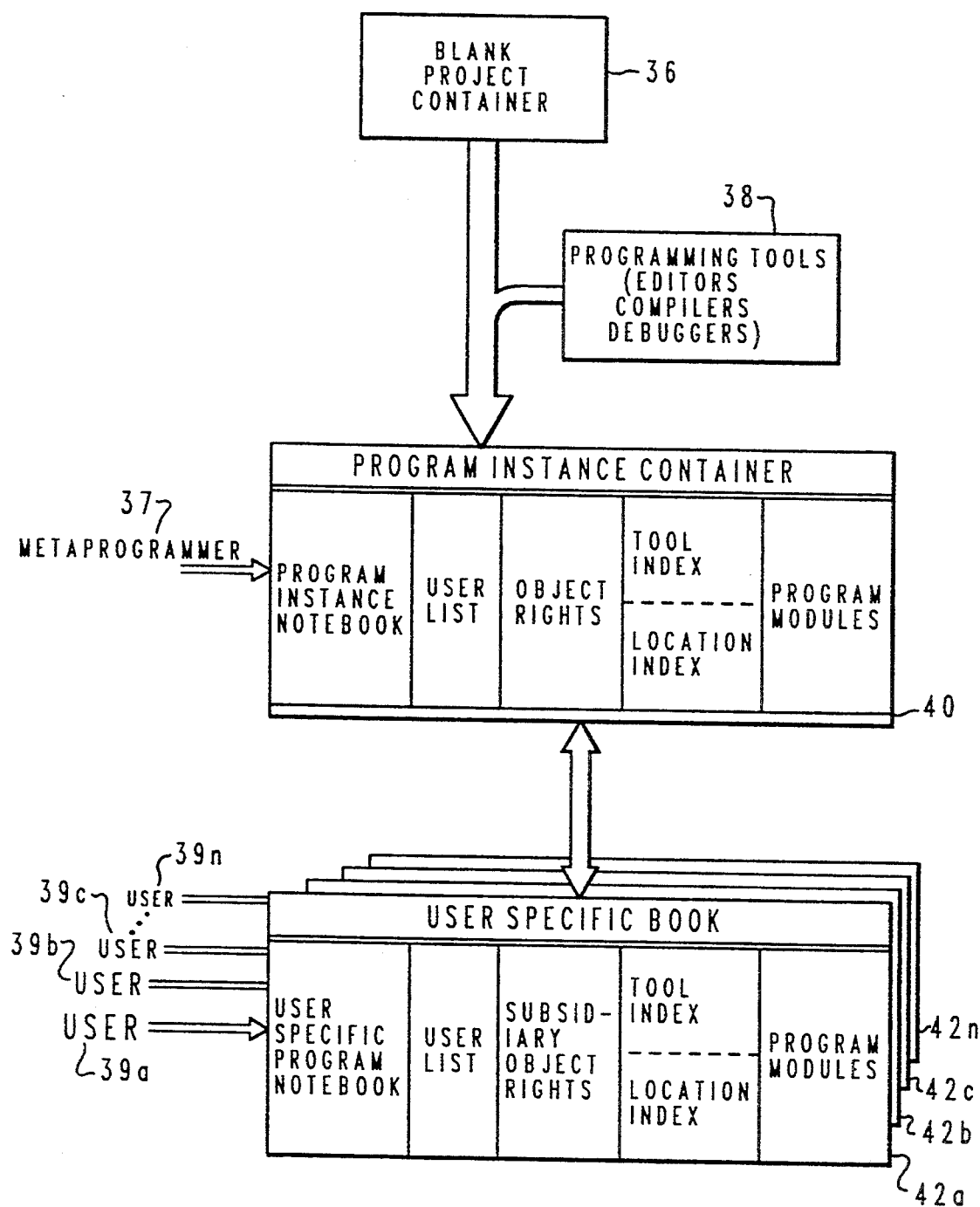
FIG. 2 is a block diagram representation of interrelationships between data objects and users which may be utilized to implement the method and system of the present invention.

FIG. 2 is a block diagram representation illustrating relationships among various data objects and system users employed in practicing the method of the invention. A blank project container 36 is a structured data object which provides a shell for use by a metaprogrammer 37 in creating a program instance specific container 40. Blank project container 36 includes a plurality of divisions referred to here as subject objects relating to subject headings for different phases and aspects of a software development project. Blank project container 36 may also include data objects such as: help text; function lists to tools for creating standard program modules; and features supporting generation of a control on various user displays resembling a spiral bound notebook including tab division headings and numbered pages. The metaprogrammer 37, in composing a program instance container 40, may supplement the container with additional programming tools such as editors, compilers, debuggers drawn from a library 38 of such tools and/or generate an index pointing to such tools. In addition, metaprogrammer 37 may supplement program instance container 40 through direct composition of a user list, object rights, user classes and definition of locations for storage of member data objects of the program instance container. Member data objects may be distributed among the storage devices of data processing system 8.

A plurality of user specific virtual program instances 42a–42n depend from program instance container 40. The contents of user specific instances 42a–42n are drawn from the contents of program instance container 40 and extend only to those objects to which users 39a–39n have some form of access rights. Such rights include read rights and manipulation rights. In addition, users 39a–39n, upon creation of data objects and/or manipulation of data objects to which they have manipulation access rights, pass changes back from user specific instances 42a–42n to program instance container 40. User specific instances 42a–42n may be apparent data objects, constructed from the contents of the program instance container. User access lists are used to select member objects of the virtual instance of the program instance container 40. Alternatively, they may be local instances of data objects themselves, periodically conformed to the contents of program instance container 40.

Figure 3:
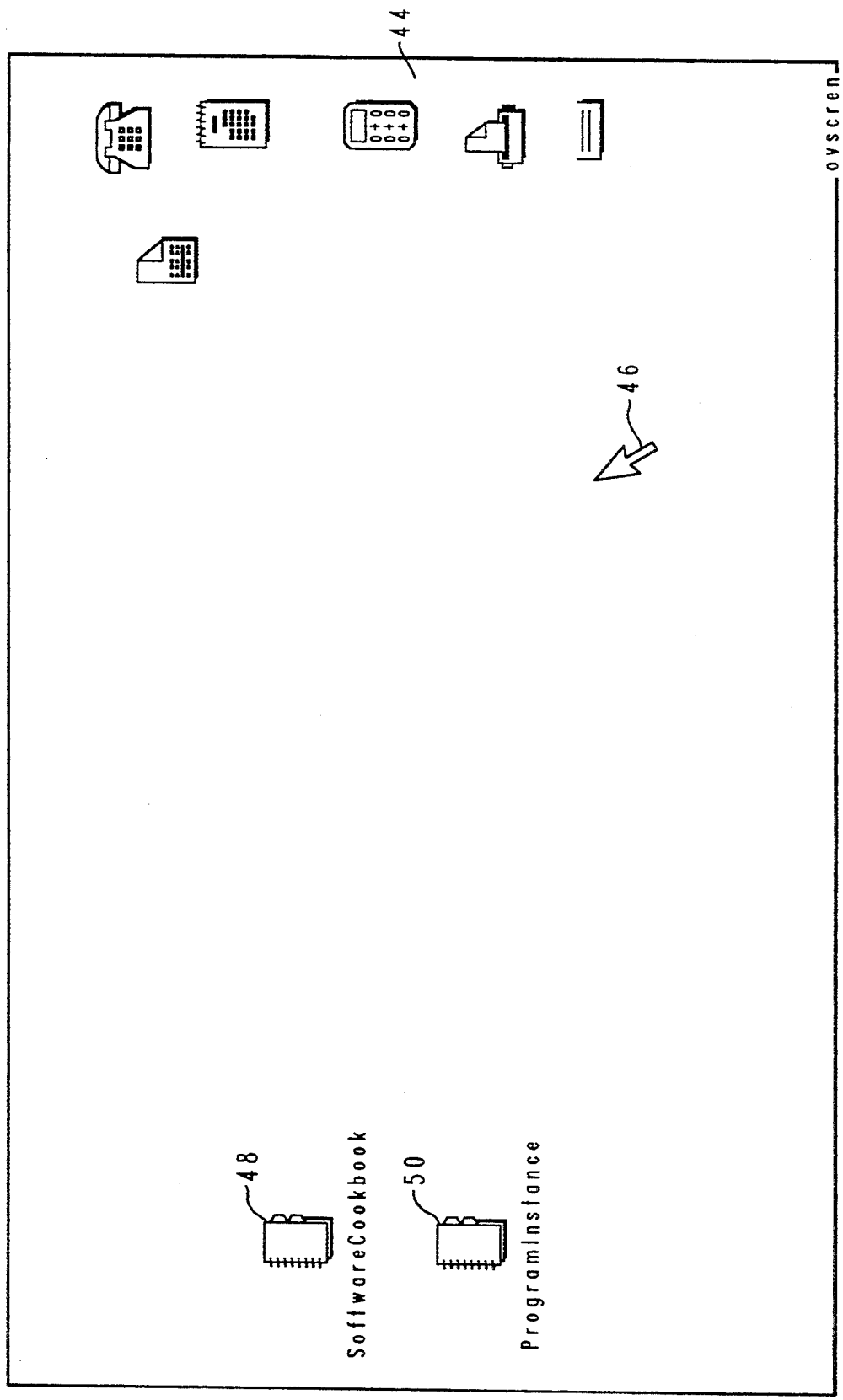
FIG. 3 is a pictorial representation of a desktop metaphor which may be utilized to implement the method and system of the present invention.

FIG. 3 is a pictorial representation depicting a desktop metaphor 44 such as is presented a metaprogrammer on the display of a terminal or personal workstation. A metaprogrammer is so-called because of the individual's authority to initiate development or administration of a software application. Desktop metaphor 44 will be familiar to those skilled in the art as supported by a graphic user interface running on a local workstation. Desktop metaphor 44 supports an object action paradigm exercised through pointer 46 which may be positioned with respect to an icon for selection and or drag operations. An iconic representation 48 appears in desktop metaphor 44 representing a blank project container 36. A second iconic representation 50 appears in metaphor 44 representing a program instance container 40. The metaprogrammer may use pointer 46 to open either iconic representation. Typically, a metaprogrammer will select iconic representation 48, drag it to a new position, and select it again to create a program instance container 40 represented by iconic representation 50. Iconic representations 48 and 50 are distinguished by their titles, in this case "Software Cookbook" for the blank project container and "Program-instance" for container 40.

FIG. 4 is a pictorial representation of controls through which a metaprogrammer may define a project and thereby create a program instance container 40. Upon opening a newly created program instance iconic representation 50, a window 52 is generated. Within window 52 is a control 54 resembling a spiral bound notebook. Notebook control 54 includes a title bar 56 which is an entry field through which a name may be applied to the project. A tab control 58 extending from one side of notebook control 54 is an open tab allowing display of contents of the program instance container 40.

A second window 60 is provided through which a metaprogrammer may exercise control of objects within program instance container 50. An add user class control tab 62 and an add book tab control 64 may be selected by a mouse pointer. An entry field 66 is available through which the metaprogrammer may name a newly added book tab. Book tabs appear as sections within notebook control 54 after it is opened. In addition, user classes may be defined through entry field FIG. 5 is a table through which a metaprogrammer may define user class rights, which are required before private instances of the program instance container 40 may be created. Rights in user classes are defined by tab sections of the notebook control 54. A table 68 including user classes across the top and book tabs across one side provides a plurality of intersections in which access rights are set. Appearing below table 68 is a block 70 which includes help text for the metaprogrammer.

Figure 6:
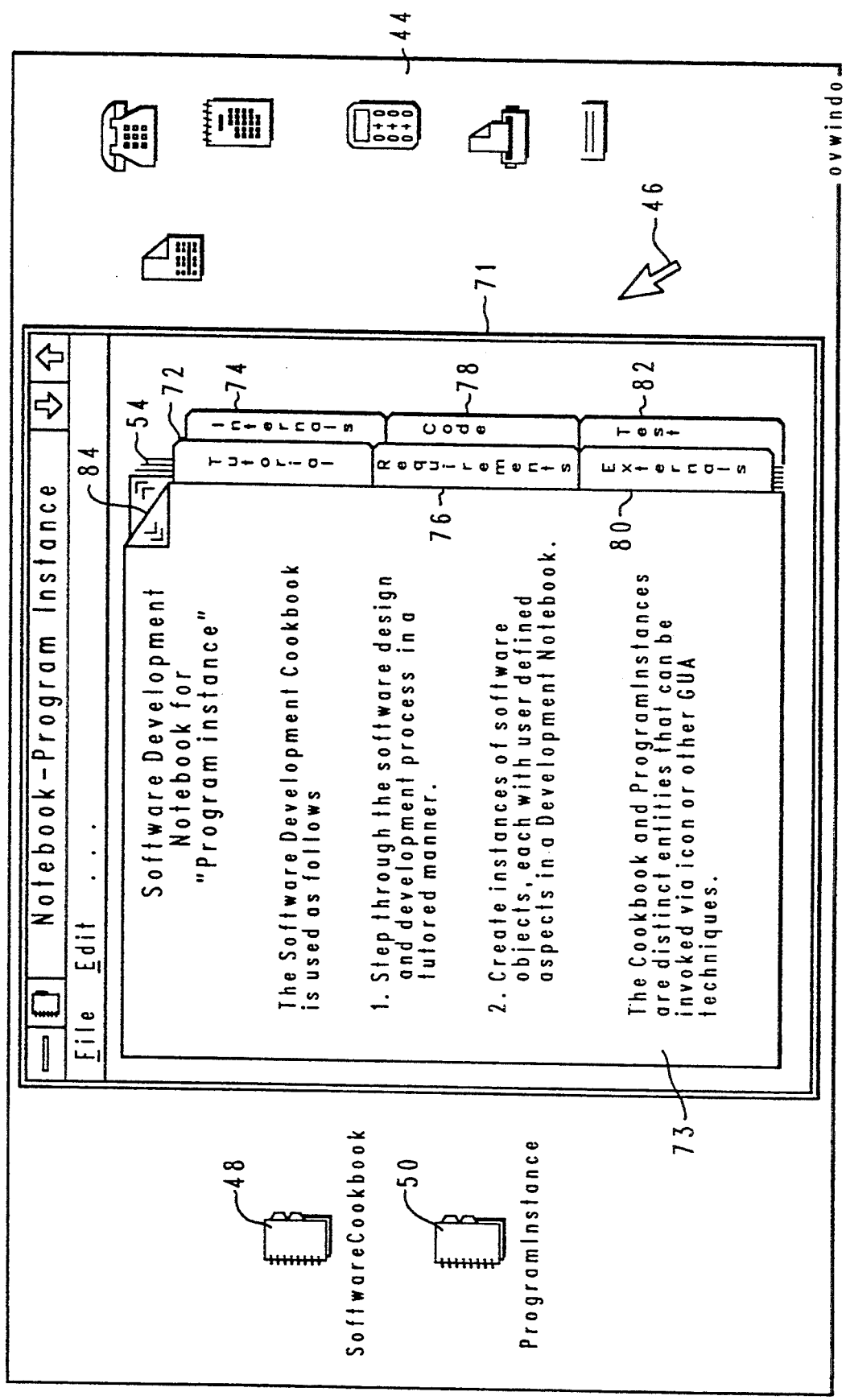
FIG. 6 is a pictorial representation of a notebook control opened to an introductory page.

FIG. 6 is a pictorial representation of notebook control 54 opened within a window 71. Notebook 54, having been opened, now displays internal tabs which here include tutorial tab 72, internals tab 74, requirements tab 76, code tab 78, externals tab 80 and test tab 82. Notebook 54 is opened to tutorial tab 72 and a page 73 from the tutorial may now be read. As is well understood in the art, pointer 46 may be moved to control features such as tabs 72–82 or paging points 84 to move about within notebook 54. The current location of a user within notebook 54 is indicated by alteration of the boundary for a tab, either by highlighting or by erasure of a line separating the tab from the display field portion of notebook 54.

Figure 7:
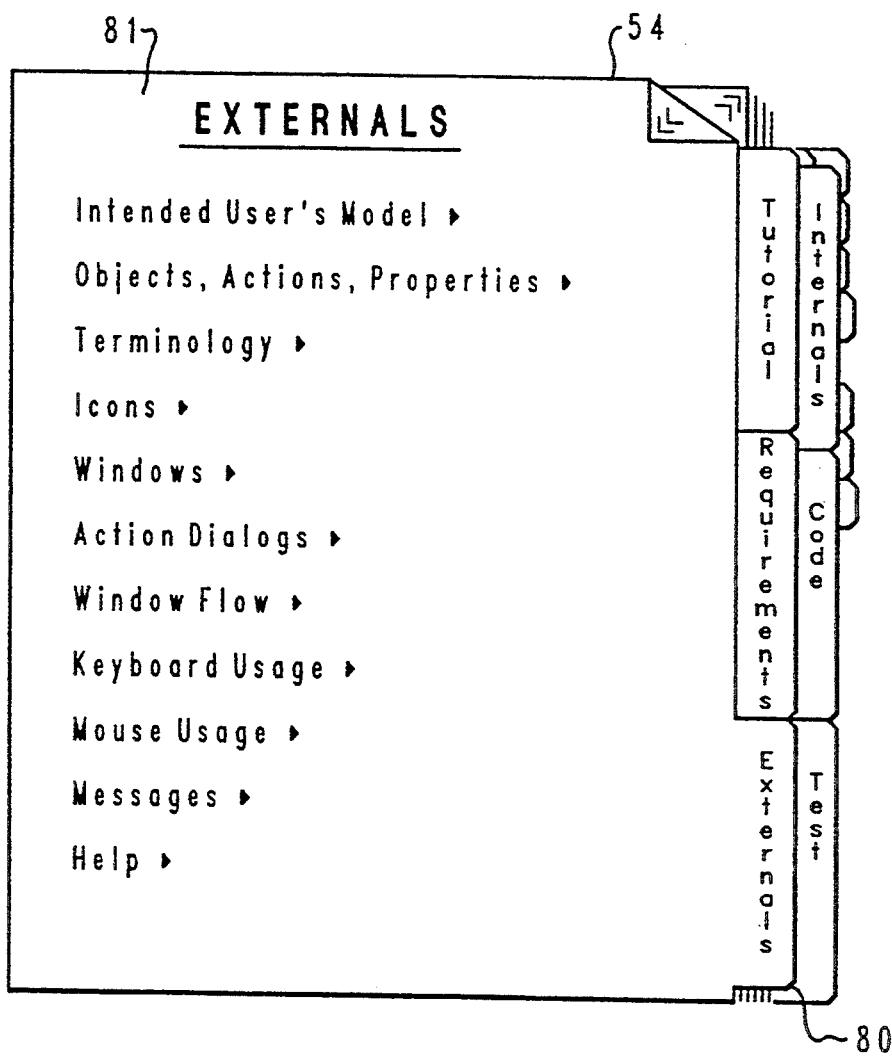
FIG. 7 is a pictorial representation of a notebook control depicting an opened tab in the notebook.

FIG. 7 illustrates notebook control 54 opened to the index page 81 of externals tab 80. Member objects of program application externals may be accessed by keying onto a line or by paging through the tab section.

Figure 8:
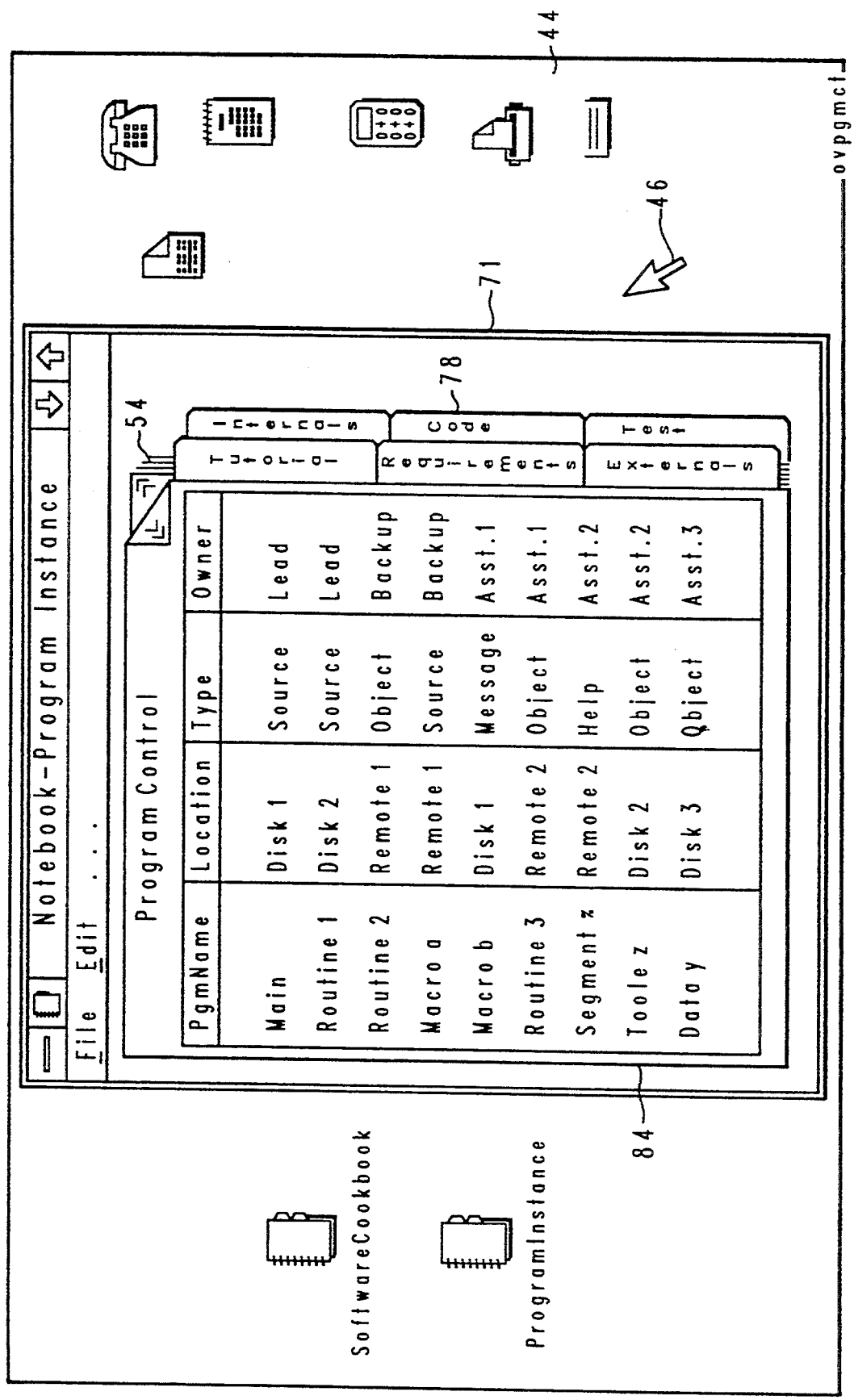
FIG. 8 is a pictorial representation of a notebook control for a program instance opened to an index page.

FIG. 8 is a pictorial representation of a control depicting, in tabular representation, a listing of program modules by name to constitute the code objects of the program application. Next to each program name, the storage location of the program is given, identification of the data type in the program, i.e. source code, object code, message text or help text is given, and lastly the responsible author or owner is identified. The entries in the control table are manipulable by the metaprogrammer. For example, resignation of an owner of a program named in the table requires naming a new owner, which can be done through control table 84. Availability of compiled or interpreted versions of program is easily ascertained under the type heading. Further, under the location heading, a user may quickly determine where to retrieve a program from for required editing. Notebook control 54 appears in opened window 82.

Figure 9:
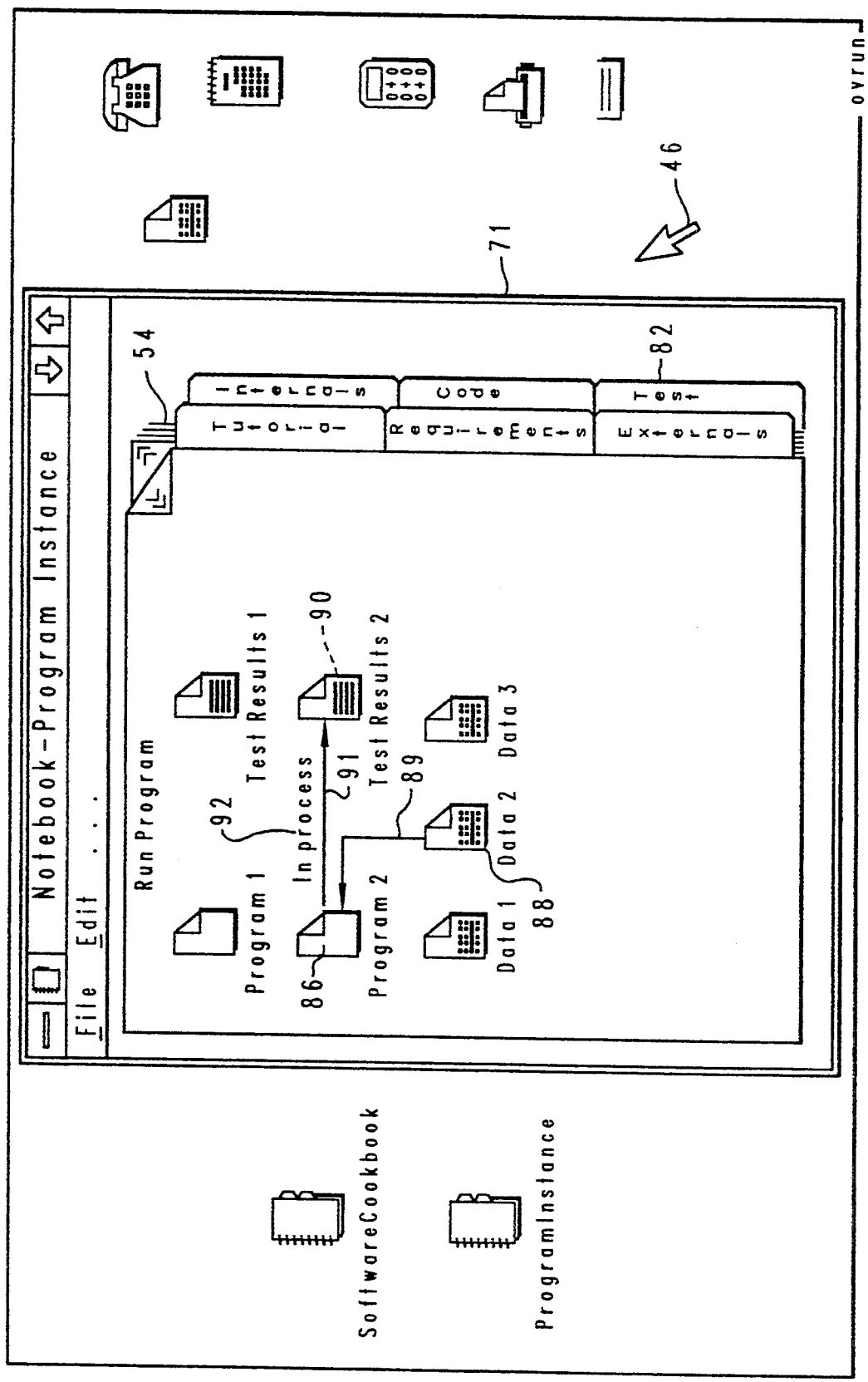
FIG. 9 is a pictorial representation of a control for a program instance depicting interrelationship of objects for testing in accordance with the method and system of the present invention.

FIG. 9 is a pictorial representation illustrating a control within notebook control 54. Illustrated is a constructed interrelationship of objects developed by a user for testing of a program module. Control notebook 54 has been opened to test tab 82. The page within test tab 82 relating to operational tests of various programs on test bodies of data includes a graphic indication of linkages between data objects. Specifically, a program represented by icon 86 is operating on a data object represented by icon 88, as represented by connection 89. Test results generated thereby are represented by icon 90 as indicated by line 91. Data objects having iconic representations within notebook 54 are identified by their names, which appear below the icons to identify the represented object to a user. Programming tools provided with the program instance automatically generate and name test result documents if desired. Pictorial representations such as illustrated in FIG. 9 may be generated by conventional graphic user interface applications.

Figures 10, 13:
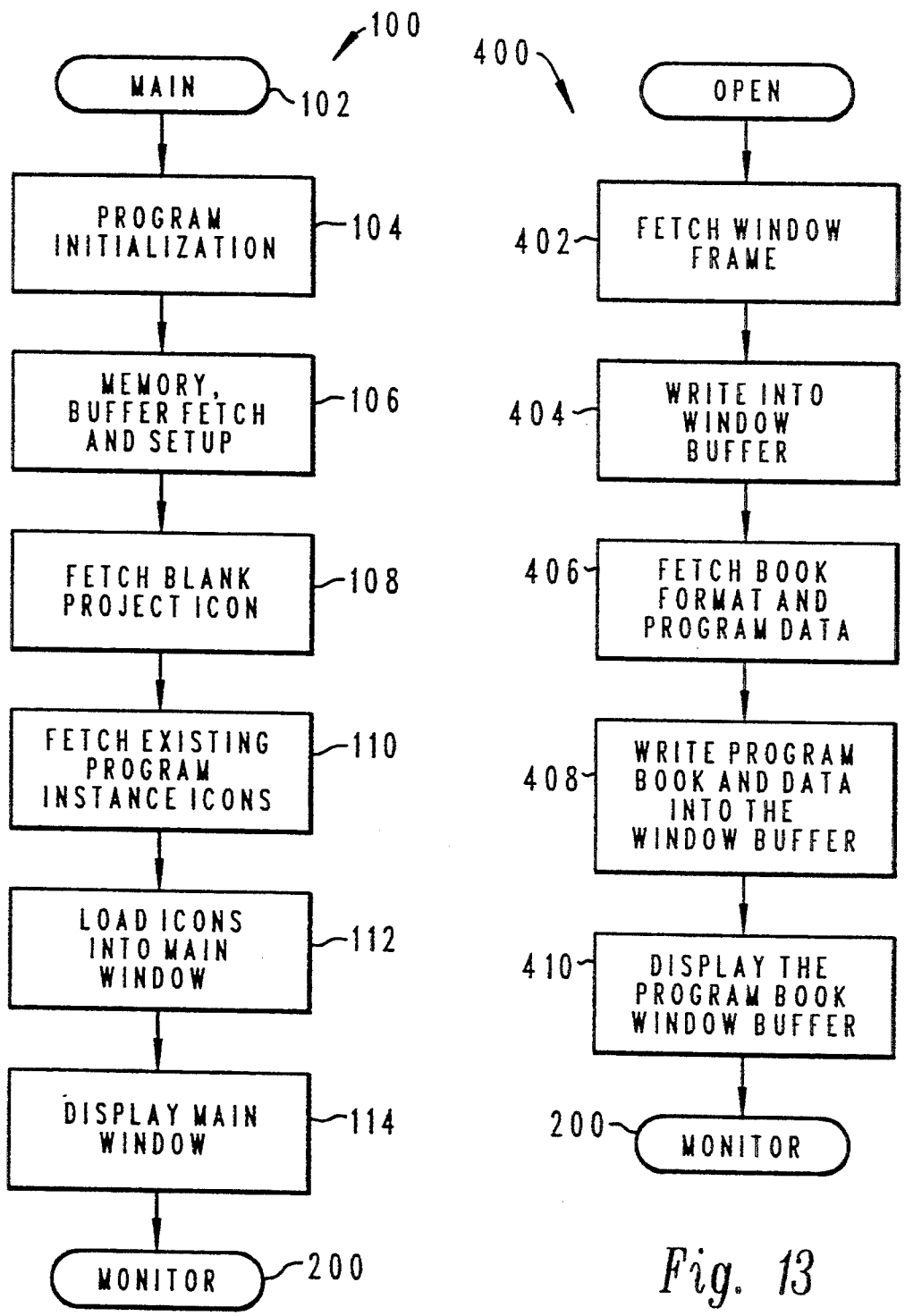
FIG. 10 is a high level, logic flowchart illustrating accessing a desktop metaphor including iconic abstracts for data objects used in the method and system of the present invention.
FIG. 13 is a high level, logic flowchart illustrating user selection of a program instance notebook.

FIG. 10 is a high level, logic flowchart illustrating generation of a desktop metaphor including iconic abstracts for a blank project container and program instances. Flowchart 100 is entered at step 102. Next, at step 104, conventional program initialization measures of a graphic user interface application running on a local processor are taken. Next, at step 106, the usual features of the desktop metaphor are fetched and a main window is established. Step 108 is applicable only to metaprogrammers. In step 108 the icon representing a blank project container is fetched for display on the desktop metaphor. Next, at step 110, icons for existing program instances to which the metaprogrammer or user is permitted access are fetched. At step 112, blank project icon and the program instance icons are loaded into the main window and transferred to the display buffer. Next, at step 114, the main window is displayed and operation enters the monitor routine 200.

Figure 11:
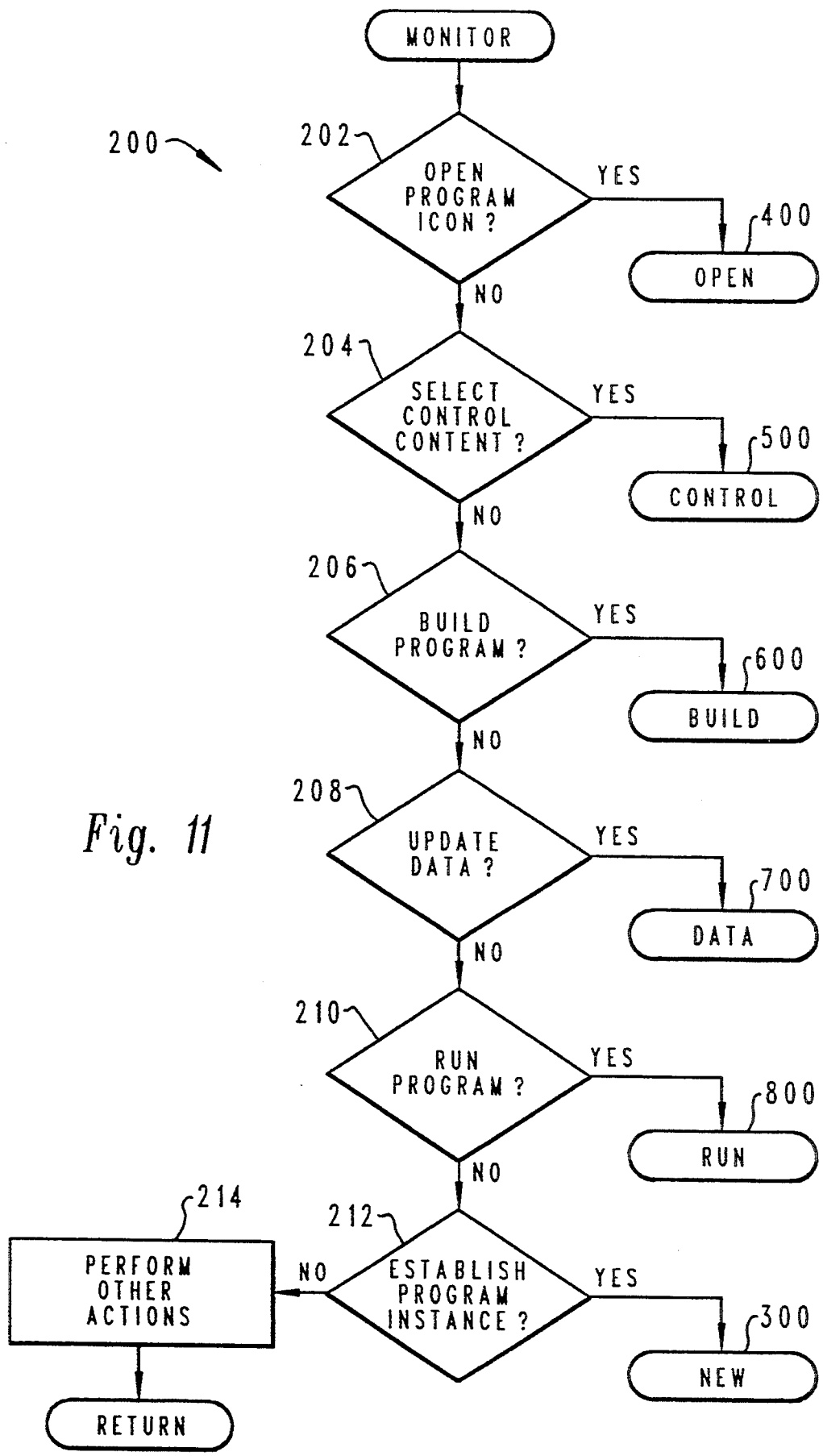
FIG. 11 is a high level, logic flowchart illustrating accessing of functional subroutines utilized to implement the method and system of the present invention.
Figure 12:
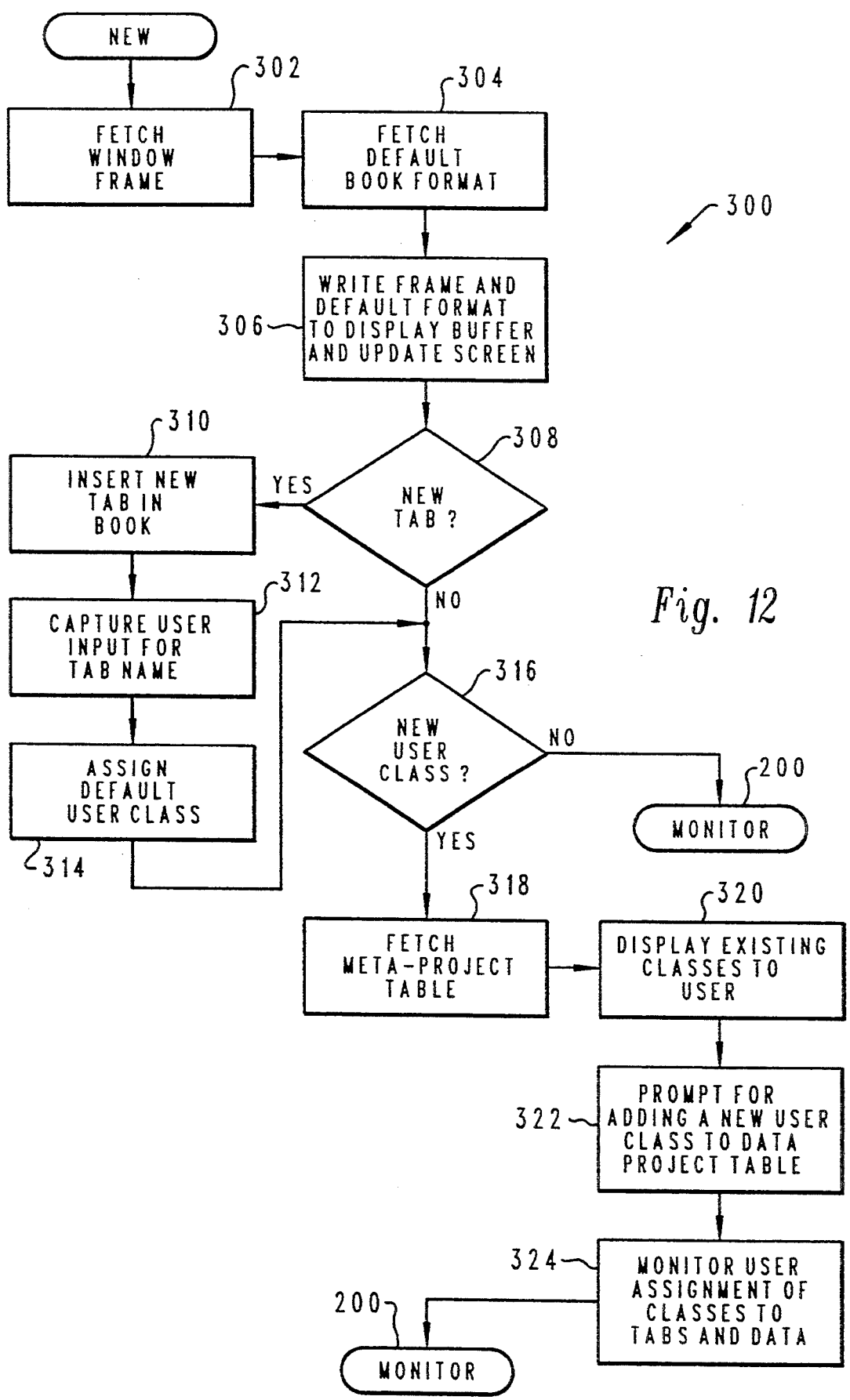
FIG. 12 is a high level, logic flowchart illustrating creation of a program instance container utilized to implement the method and system of the present invention.

Monitor routine 200 relates to user access to the functional subroutines utilized to implement the method and system of the present invention. FIG. 11 is a high level, logic flowchart of monitor routine 200. Essentially, a user's actions through a keyboard or mouse are monitored for one of six requests. The requests are, at step 202, a request to open existing program instance icon. At step 204, a user may select a control content routine relating to changes in control table are detected. At step 206, a user may request a function to build object code from source code. Decision block 208 permits user access to tools such as editors for modifying the contents of data objects such as program modules, help texts, or test data modules among other things. Test routines for a programmer available through run program decision block 210. For metaprogrammers, an additional decision block 212 is provided relating to establishment of a new program instance container. Block 214 labeled "perform other action" indicates that the computer system is available for other tasks from the desktop metaphor than those related construction of a program. From the return, the program returns to step 202 to monitor further steps. Decision steps 204–210 are not available from the main window until a program icon has been opened through open routine 400 or a new program instance has been established through new routine The YES branches from decision blocks 202 through 212 transfer operation to functional routines indicated by open routine 400, control routine 500, build routine 600, data routine 700, run routine 800 and new routine 300, respectively.

New routine 300 provides generally for establishment of new project instance containers and the outlining of a software application package development project. Upon selection of software cookbook icon 48, a window frame is fetched for display over the desktop metaphor (step 302). Next, at step 304, the blank project container includes a default notebook format represented by tab controls for the subject headings or subject objects of the notebook. This format is fetched at step 304 and at step 306 the window frame and default notebook format are written to a display buffer for update of the display screen.

Now, the metaprogrammer may modify the notebook format to conform with the outlines of the new project. At step 308, it is determined if the metaprogrammer has decided upon adding a subject object to the project instance container. This step will be represented to the metaprogrammer as the addition of a tab section to the program instance notebook. Such a selection is detected at step 308. Along the YES branch from step 308 the operating steps required to establish such a tab section are taken. First, at step 310 the new tab appears in the notebook. At step 312, the metaprogrammer is prompted to name the tab. Optionally, at step 314, a default user class may be assigned access rights to the tab. Operations from step 314 merge with the NO branch from step 308 for steps relating to identification of new user classes and assignment of access rights.

The metaprogrammer has the ultimate right to assign access rights and authorize users of a program instance container. These rights are exercised by selection of a new user class operation through decision block 316. Even though such modification or addition is requested, the NO branch from step 316 returns operation to the monitor program. Along the YES branch from decision block 316, step 318 relating to fetching of the metaproject table is reached. The metaproject table is that accessed through window 60 of FIG. 4 and is represented in block 68 and 70 of FIG. 5. At step 320, existing classes and user groups, and the respective rights of the users are displayed to the metaprogrammer. Then, at step 322, a prompt is provided for adding a new user class to the data project table. At step 324, the metaprogrammer is monitored for editing of the metaproject table. Upon completion of such editing, the monitor program is reentered.

FIG. 13 is a high level, logic flowchart illustrating user accessing of a program instance container. The program instance container will be presented to the user as a notebook within a window. Accordingly, flowchart 400 provides for fetching a window frame (step 402). The window frame is written into buffer for display (step 404). Next, the notebook format permitted the user and program data are fetched and merged for presentation as a notebook to the user (step 406). The program book and data are thereupon written into the window buffer (step 408) and the program notebook control are then displayed (step 410). Operation is returned to monitor program 200 for further user actions.

Figure 14:
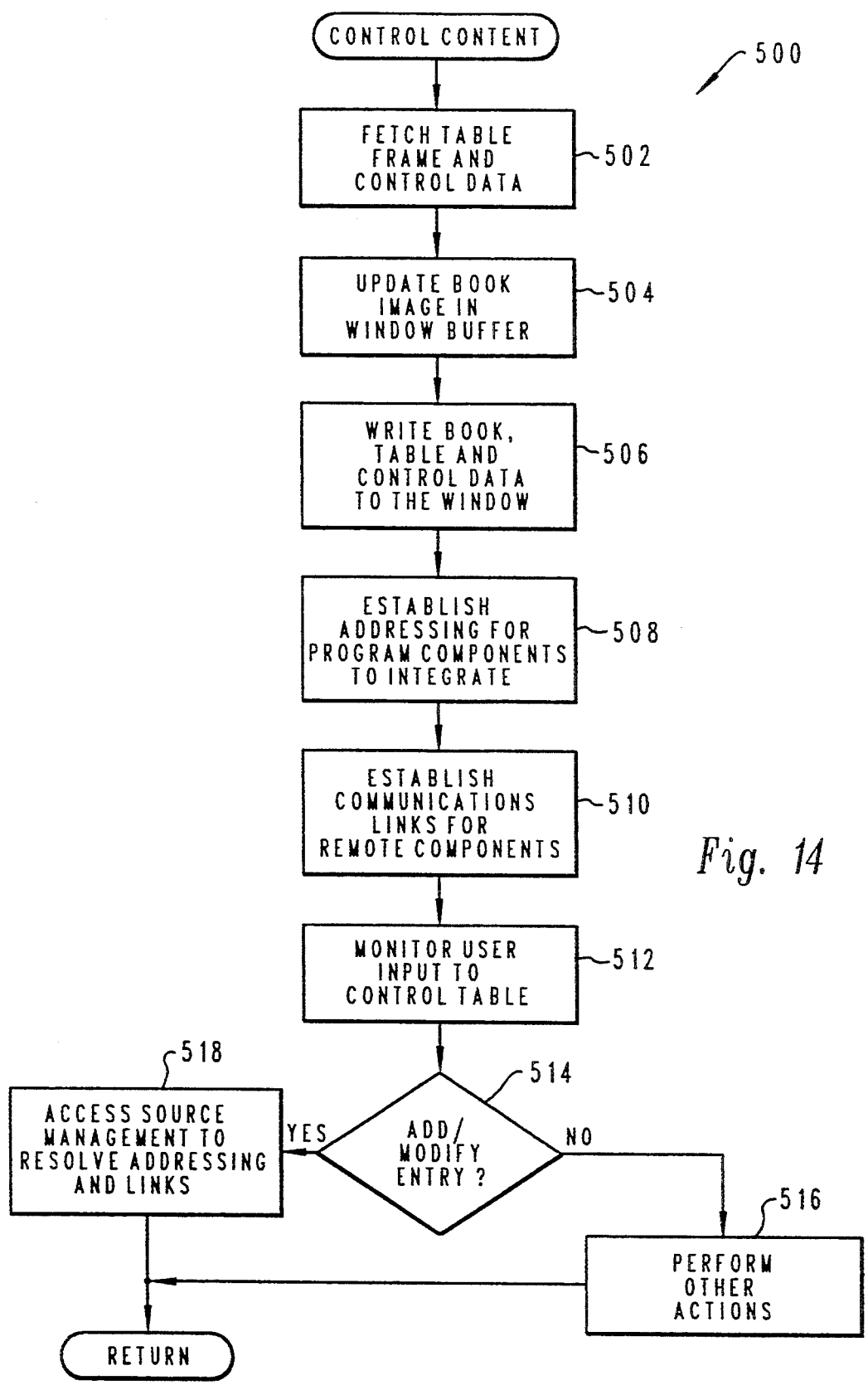
FIG. 14 is a high level, logic flowchart illustrating accessing a control table for setting object storage locations and establishing communications links utilized to implement the method and system of the present invention.

FIG. 14 is a high level, logic flowchart illustrating user or metaprogrammer accessing of a control table for determining data object storage locations and for the establishment of communication for moving of or interaction between data objects. Essentially, a user is allowed to edit table 84 through control content routine 500. Steps 502, 504 and 506 relate to creation and display of a control table 84 to a user. A table frame and the appropriate data for placement in the frame are recovered from memory (step 502), the book image in the window buffer is updated to reflect the appropriate controls for manipulating the control table (step 504) and then the entire book table and appropriate data are written into the window (step 506). At step 508, addresses for program components are interpreted for machine usage to access components stored at sites remote to the current user. Step 510 reflects the establishment of communication sessions or links to remote components to access program components stored on those remote units. Thus, control table 84 is made available for user editing. User edit inputs are detected at step 512.

Figure 15:
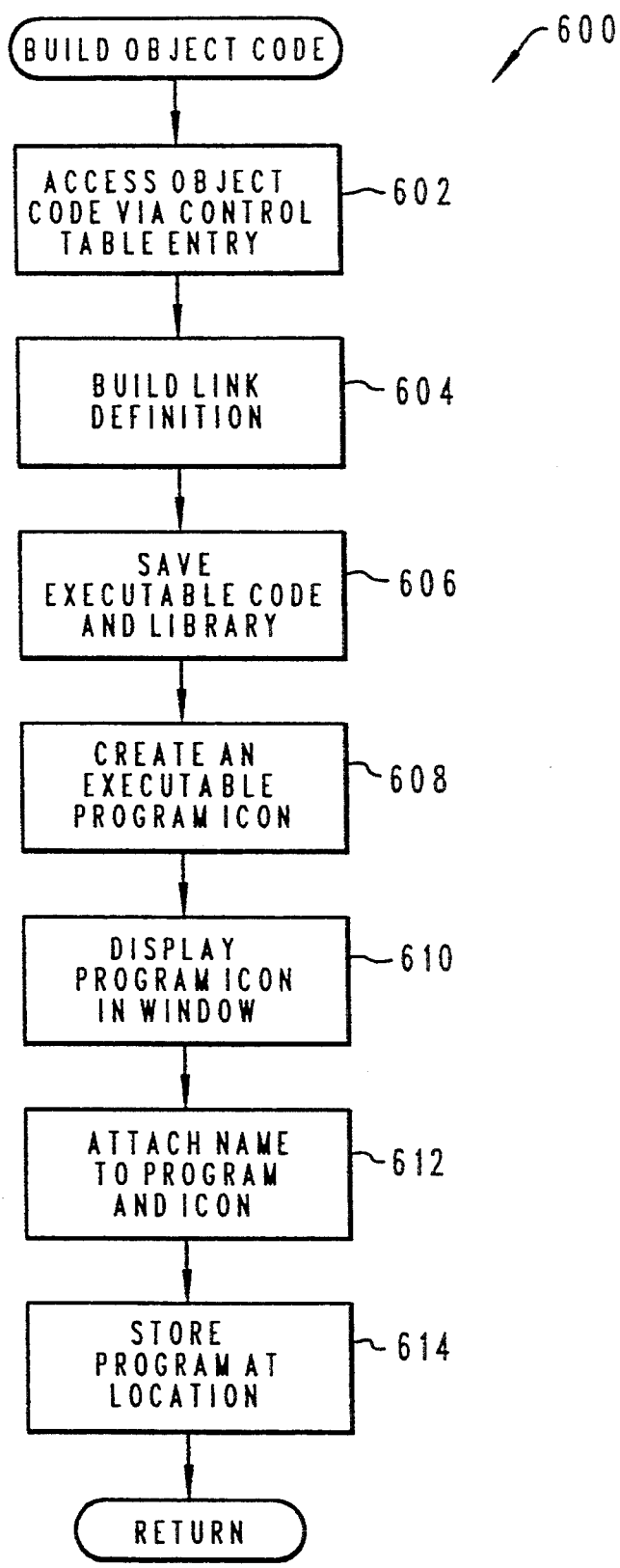
FIG. 15 is a high level, logic flowchart illustrating accessing a source code document for translation thereof to object code and generation of an object to retain the object code for implementing the method and system of the present invention.
Figure 16:
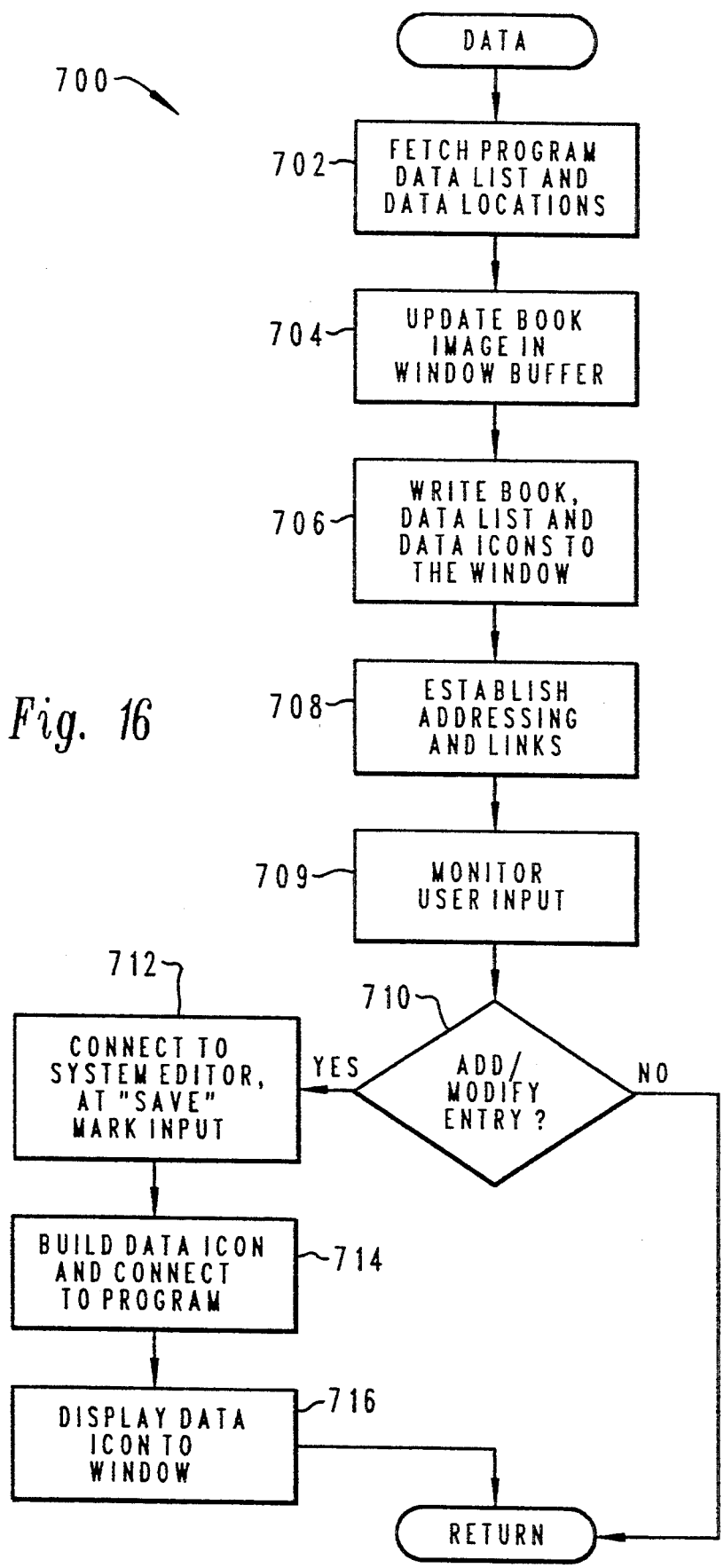
FIG. 16 is a high level, logic flowchart illustrating selecting data objects as inputs for object code objects which may be utilized to implement the method and system of the present invention.
Figure 17:
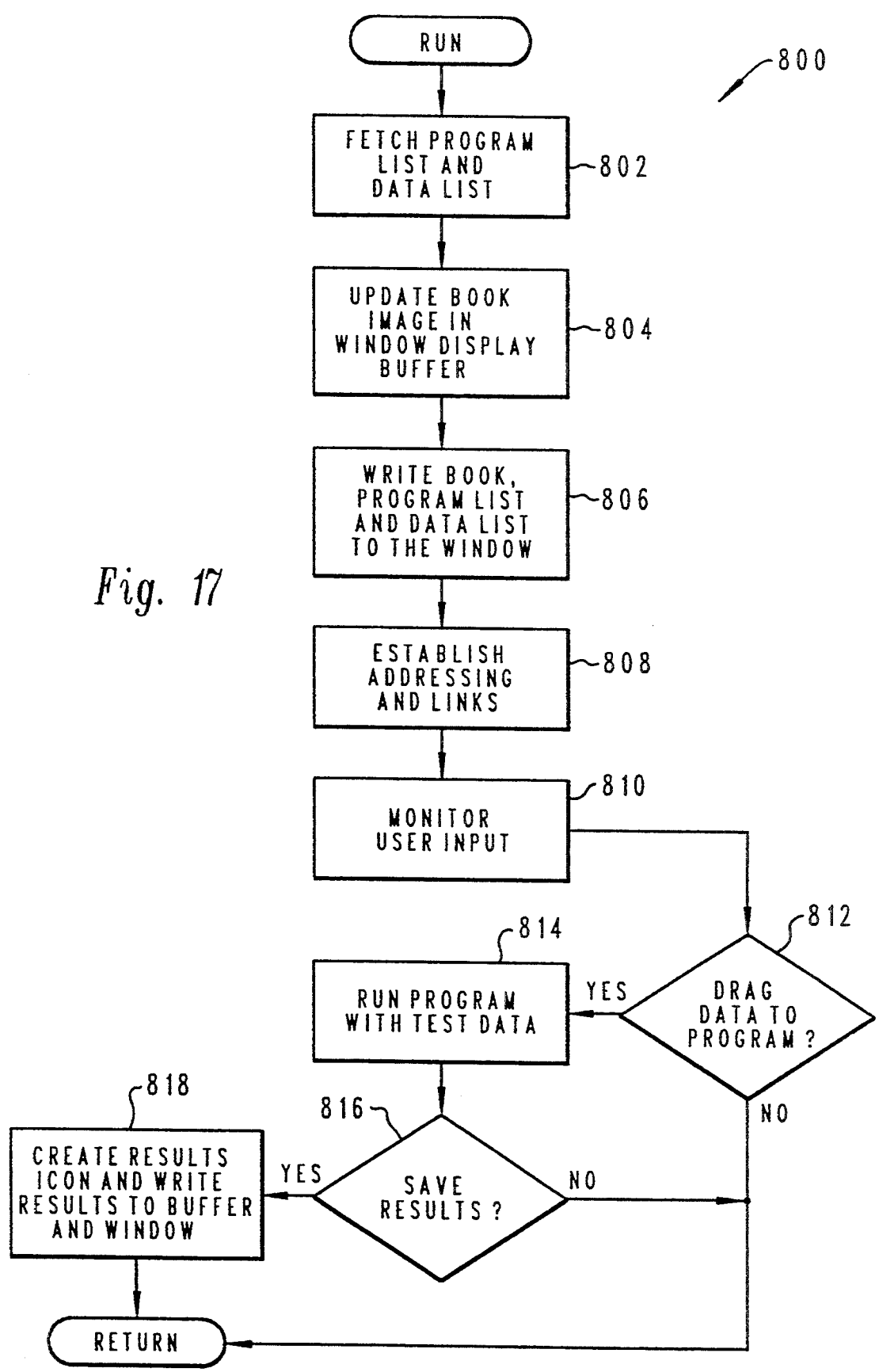
FIG. 17 is a high level, logic flowchart illustrating the testing of code modules which may be utilized to implement the method and system of the present invention.

The user inputs may constitute an addition of an object to the table or a request to modify an entry. Step 514 reflects detection of such a user action. Along the YES branch from step 514, a source management facility is accessed to carry out the user requested modifications. For example, a modification of a location requires source management to transfer the data object from one remote facility to another remote facility, preferably requiring establishment of a direct communication session between the two remote components to carry out the transfer (step 518). The NO branch from decision block 514 allows for performance of some other action (step 516), such as rearrangement of entry records in the control table. From both steps 516 and 518, execution is returned to the monitor routine FIG. 15 is a high level, logic flowchart depicting a build object code routine 600 invoked when translation of object code to source code is undertaken. The routine is not concerned with the actual mechanics of translation, but rather with the event and with informing a user that a translation event has occurred. An object code module may be accessed through its control table entry (step 602). At step 604, a link definition from the object code data object to a source code data object is established and the translation or compilation process is undertaken to provide data for the source code data object. Step 606 reflects save operation of the data object containing the executable source code and the creation of a library entry identifying the object. Next, at step 608, an icon is created representing the new source code data object. At step 610, a new program icon is displayed in a window and at steps 612 and 614, respectively, the user is prompted to attach a name to the data object and its representative icon and to select a location for storage of the data object. Again, execution is returned to the monitor program 200.

Data routine 700 relates to event display of user editing and creation of modules, particularly source code data objects within a project container. Steps 702, 704 and 706 relate to memory fetches of appropriate indices for identification of a data object for recovery, and the display within a window buffer of the appropriate lists, notebook controls and representative icons to a window for user use. At step 708, upon user selection of a data object, addresses for recovery of the object are determined and a communication session is established permitting user editing of the object. Further, user inputs are then monitored (step 709).

User inputs resulting in modification of a data object or the addition of a data object are detected at step 710. Any other user inputs result in exit from decision block 710 along the NO branch and return to the monitor routine 200. Along the YES branch from decision block 710, the user is provided connection to a system editor for modifying the actual data of a data object. The modified data object or new data object is marked within the system upon a save of the object by the user. At step 714, a representative icon for a new entry is added and the data object is linked to the program instance container. At step 716, the icon may be displayed in the window and operation is returned to monitor routine 200.

No program application is complete for release to the use of the public until it has been tested. Run routine 800 relates to event monitoring of such testing. Steps 802, 804 and 806 relate to the fetching and display to a user of data objects, lists and generation of the window for display of the lists and objects that a user may wish to access in executing testing. Upon user requests of objects, addresses for those objects are determined and communication sessions are established to allow interaction between the objects (step 808). User initiation of activity is then monitored (step 810).

A test of a program module involves a test of a functionality of the program with respect to data designed to exercise those functions. A user initiates such a test by selecting an icon representing the appropriate test data and dragging it to the program to be exercised. Such user action is detected at step 812. The NO branch from step 812 reflects detection of some other user action and returns operations to monitor routine 200. Along the YES branch from step 812, step 814 is run, resulting in the program module executing on the indicated test data. Results are obtained and are displayed to the user. The user may wish to save the results as verification of the operability of the routine or for use in diagnostic purposes in editing the underlying source code module. Accordingly, at step 816, the user is allowed to save the results. If the user chooses not to save the results, they are discarded and execution is returned to the monitor routine 200. If a user saves the results, a data object within the project instance container is created and a results icon is generated for user selection of display of the results in a window (step 818). After step 818, the execution returns to monitor routine 200.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. In a data processing system including a plurality of workstations, each having a display and a user input device, the data processing system further including a shared memory with each of the workstations being connected for accessing data stored in the shared memory, a method of organizing work of a metaprogrammer and a plurality of system users in the generation of a software application package, the method comprising the steps performed by a computer system of:

creating a blank project container including a plurality of subject container objects for access by the metaprogrammer;

responsive to system user selection, storing a project specific container in the shared memory, said project specific container initially replicating the contents of the blank project container wherein the subject container objects relate to phases in a product life for the software application package;

creating a directory to templates for use in creating routine modules;

establishing functions for generating code for data objects;

generating an index of objects located in each subject container object, and to objects in the project specific container;

creating for each user a private instance derived from the project specific container, each private instance including a selected subset of the objects within the project specific container;

establishing a session between a user and the project specific container on a workstation; and generating an iconic abstraction for the private instance of the user on the display screen of the workstation in response to the establishment of a session.

2. A method of organizing work of a metaprogrammer and a plurality of system users as set forth in claim 1, the method further comprising the steps of:

establishing a session for a metaprogrammer on a workstation; and generating an iconic abstraction of the blank project container on the display of the workstation.

3. A method of organizing work of a metaprogrammer and a plurality of system users as set forth in claim 8, the method further comprising the steps of:

responsive to user selection of the iconic abstraction of the private instance, displaying on the display of the workstation a control that resembles a notebook displaying contents of the private instance.

4. A method of organizing work of a metaprogrammer and a plurality of system users as set forth in claim 3, the method further comprising the steps of:

organizing data corresponding to program code and support documentation by objects; and displaying the objects as pages of the control.

5. A method of organizing work of a metaprogrammer and a plurality of system users as set forth in claim 1, wherein the objects of the project specific container include user oriented system tutorials, a library of functions, a list of users, a library list of program objects, a library list of documents, a library of test cases, a library of programming specifications, an objective document and a request document.

6. A method of organizing work of a metaprogrammer and a plurality of system users as set forth in claim 1, the method comprising the further steps of:

responsive to metaprogrammer selection, identifying permitted system users;

responsive to metaprogrammer selection, defining classes of system users; and establishing access rights to objects for each class of users, wherein the private instance of each user includes objects based upon a system user having some type of access right to the objects.

* * * * *

UNITED STATES PATENT AND TRADEMARK OFFICE
CERTIFICATE OF CORRECTION

PATENT NO. : 5,428,729
DATED : June 27, 1995
INVENTOR(S) : Chang et al.

It is certified that error appears in the above-indentified patent and that said Letters Patent is hereby corrected as shown below:

In column 5, line 13, please change "S" to --8--.

In column 6, line 52, after "field", please add --66.--.

In column 8, line 25, after "routine", please add --300.-.

In column 9, line 58, after "routine", please add --200.--.

Signed and Sealed this

Sixteenth Day of July, 1996

*Attest:*

BRUCE LEHMAN

*Attesting Officer*     *Commissioner of Patents and Trademarks*